Figure 1:
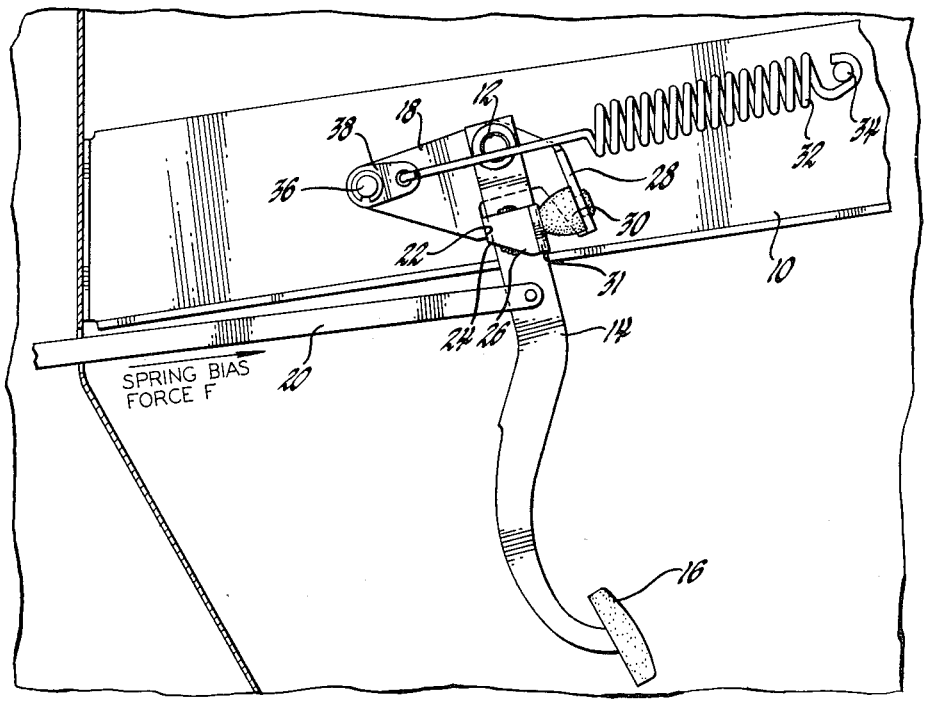

Aug. 10, 1965    W. C. ZETYE    3,199,367

ACTUATING MECHANISM

Filed April 15, 1963

INVENTOR.
Walter C. Zetye
BY
E. W. Christen
ATTORNEY

United States Patent Office 3,199,367
Patented Aug. 10, 1965

3,199,367
ACTUATING MECHANISM
Walter C. Zetye, Southfield, Mich., assignor to General Motors Corporation, Detroit, Mich., a corporation of Delaware
Filed Apr. 15, 1963, Ser. No. 273,223
4 Claims. (Cl. 74—512)

This invention relates to an actuating mechanism and more particularly to a mechanism including an actuator movably mounted on a support for movement in a given direction from a normally biased position to another position against an opposing bias force and with minimum actuating force.

Frequently, in the design of motor vehicles, the operator's compartment dimensions are such that it is desirable that clutch pedal travel required to disengage the vehicle's clutch mechanism be a minimum to insure maximum operator comfort. However, clutch levers to which the pedals are secured are usually spring loaded in a manner that if the pedal travel required is reduced, a greater pedal pressure will be required to disengage the clutch mechanism. In congested traffic, such a reduction in pedal travel will prove fatiguing for the operator. In the prior art, this problem has been overcome somewhat by utilizing an overcenter spring in conjunction with the clutch lever to augment manual pedal pressure, the spring being connected in a manner providing resistance to initial depression of the clutch pedal and thereafter inducing reverse pressure tending to assist manual depression of the pedal. Hence, it would appear that by utilizing a stiffer overcenter spring pedal travel might be reduced to a minimum. However, by increasing the stiffness of such a spring, the more unstable will be the force moment exerted by it on the clutch lever when the spring is in the area of just going overcenter, since a slight change from overcenter position results in a large change in the force moment. The unstability will result in an erratic clutch pedal motion and thus a loss of pedal sensitivity on the part of the operator.

In accordance with this invention an actuator, such as a clutch lever, is movably mounted on a support for movement in a given direction from a first biased position to a second position against an opposing bias force in a manner similar to that described above but without utilizing a stiffer overcenter spring. This is accomplished with a control member pivotally mounted on the support and having a stop portion and a driving portion respectively effectively engaged with the actuator when the actuator is in the first and second positions and respectively effectively disengaged therefrom when the actuator is in the second and first positions. A resilient member connects the control member with the support and has successively opposing and aiding off-center positions with respect to the pivot axis of the control member as the actuator is moved in the given direction from the first position to the second position to respectively exert opposing and aiding forces on the actuator via the stop portion and the driving portion, respectively, to movement of the actuator in the given direction.

Figure 2:
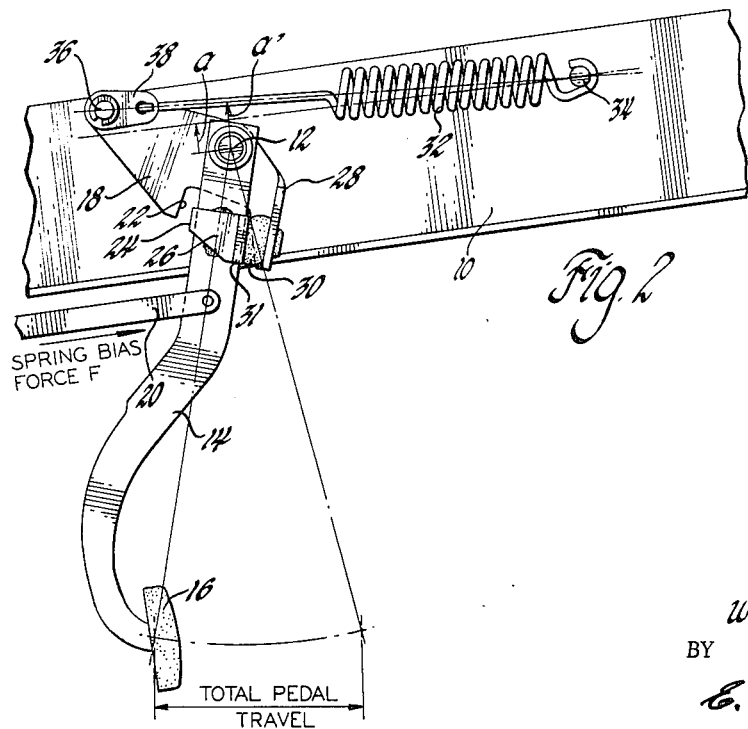

A more complete understanding of the invention may be had from the detailed description which follows taken with the accompanying drawings in which:

FIGURE 1 is a fragmentary side elevational view of portions of a vehicle illustrating the structure of the invention in a clutch engaged position; and FIGURE 2 is a fragmentary side elevational view illustrating the structure of the invention in a clutch disengaged position.

Referring now to the drawings, and more particularly to FIGURE 1, there is shown a motor vehicle body portion 10 having a pivot post 12 protruding normally therefrom. A suspended clutch lever 14 is pivotally mounted at one end on the pivot post 12 and has a foot pedal 16 secured thereto on the opposite end. A clutch control rod 20 is pivotally mounted at one end on the lever 14 at a central portion thereof. The control rod 20 when in a clutch engaged position, as shown in FIGURE 1, serves to engage a clutch mechanism, not shown, and in a clutch disengaged position, as shown in FIGURE 2, serves to disengage the clutch mechanism. It is to be understood that internal springs in the clutch mechanism serve to normally bias the rod 20 in the clutch engaged position with a spring bias force F acting in the direction of the arrow, as shown in FIGURES 1 and 2. The spring bias force F is such that it is increasingly greater as the lever 14 is pivoted in a clockwise direction, as viewed in FIGURES 1 and 2, to actuate the control rod 20 from the clutch engaged position toward the clutch disengaged position.

In accordance with this invention, means are provided for aiding the operator in actuating the rod 20 from the clutch engaged position to the clutch disengaged position with minimum pedal pressure on pedal 16. The means include a clutch control bracket 18 pivotally mounted at one end on the pivot post 12 inwardly of the lever 14 for pivotal motion independently of the lever. The bracket 18 defines a stop portion or surface 22 which, when the lever 14 is in the clutch engaged position, is in engagement with a flange 24 extending transversally of the lever 14 and toward the body portion 10 from a strap 26, suitably secured to the lever 14. In addition, the bracket 18 defines a driving portion or flange 28 extending transversally from its pivoted end outwardly of the body portion 10 and having mounted thereon a rubber cushion 30. When the lever 14 is in the clutch engaged position, the cushion 30 is lightly in engagement with a flange 31 extending transversally from the strap 26 and outwardly of the body portion 10. Hence, with the lever 14 so positioned, the flange 28 is effectively disengaged from the lever.

A coil spring 32 is pivotally mounted at one end on a boss 34 protruding normally from the vehicle body portion 10 and at the other end with a boss 36 protruding normally from the bracket 18, via a pivot plate 38. The spring 32 serves to respectively exert opposing moments on the bracket 18 about the pivot post 12 in accordance with whether its axis, as defined by the bosses 34 and 36, is off-center above or off-center below the axis defined by the pivot post 12. When the control rod 20 is in the clutch engaged position the axis of the spring 32 is off-center below the axis of the pivot post 12, as shown in FIGURE 1, and hence the spring exerts a counterclockwise or opposing moment on the lever 14, via the stop surface 22 of the bracket 18, to oppose actuation of the rod 20 to the clutch disengaged position. On the other hand, when the control rod 20 is in the clutch disengaged position the axis of the spring 32 is off-center above the axis of pivot post 12, as shown in FIGURE 2, and hence the spring exerts a clockwise or aiding moment on the lever 14, via the flange 28 and the cushion 30, to aid the vehicle operator's pedal pressure in maintaining the mechanism in the clutch disengaged position. The characteristic of the spring 32 is such that the aiding moment exerted on the lever 14 will not exceed the opposing moment exerted thereon by the spring force F, and hence, upon release of the operator's pedal pressure the lever 14 and the control rod 20 will return to the clutch engaged position.

In operation, upon actuation of the lever 14 by the vehicle operator exerting pressure on the pedal 16 so as to pivot it in a clockwise direction about the pivot post 12, as viewed in FIGURE 1, the bracket 18 will be caused to pivot in a clockwise direction against the combined effect of an opposing moment exerted thereon by the spring 32 and that due to the spring force F. As the axis of the spring 32 goes overcenter, i.e. from below to above the axis defined by the pivot post 12, a moment in a clockwise direction will be exerted on the bracket 18 by the spring 32. The cushion 30 will compress, as shown in FIGURE 2, due to the difference in the forces exerted thereon by the spring 32 and the operator's pedal pressure and the effect of the opposing spring bias force F and transmit the differential force to the lever 14. In this manner, the flange 28 effectively engages the flange 31 so as to exert a clockwise aiding moment, due to the differential force, on the lever 14. The aiding moment will augment the operator's pedal pressure in actuating the rod 20 to the clutch disengaged position. The compression of the cushion 30 permits a degree of relatively free pivotal movement of the bracket 18 in the clockwise direction so that, in the clutch disengaged position, the axis of the spring 32 is off-center above the pivot axis of post 12 by the distance of a moment arm $a'$, as shown in FIGURE 2. This compares with a shorter moment arm $a$ which would have resulted had the cushion 30 not compressed. Accordingly, the compression of the cushion permits a longer moment arm and, hence, a greater aiding moment acting on the lever 14 to augment the operator's pedal pressure. By eliminating the cushion 30, a longer moment arm than either arm $a$ or $a'$ would result when the flange 28 engages the flange 31, but such an engagement might be relatively abrupt as the axis of the spring 32 goes overcenter above the axis of the pivot post 12. The abrupt engagement might result in erratic motion of the lever 14 and hence a loss of pedal sensitivity on the part of the operator. Such erratic motion is eliminated or minimized by the cushion as it compresses. If the operator now releases pressure from the pedal 16, the spring bias force F will cause the control rod 20 to return to the clutch engaged position and the cushion 30 will expand to its normal size, as shown in FIGURE 1.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. In a motor vehicle of the type having a clutch pedal pivoted on the body for manual operation between clutch engaged and disengaged positions against clutch spring means that biases the pedal to engaged position with a force that increases with movement of the pedal to disengaged position, the improvement comprising means for augmenting the spring bias on the pedal in engaged position and for partially counteracting the spring bias in disengaged position including a control member pivoted on the body and having a lost motion connection with the pedal through stop and drive portions and a spring having its ends pivoted to the body and control member for overcenter movement, the spring urging the stop portion of the control member against the pedal with the pedal in fully engaged position and urging the drive portion against the pedal with increasing leverage with pedal movement to fully disengaged position.

2. In a motor vehicle of the type having a clutch pedal pivoted on the body for manual operation between clutch engaged and disengaged positions against clutch spring means that biases the pedal to engaged position with a force that increases with movement of the pedal to disengaged position, the improvement comprising means for augmenting the spring bias on the pedal in engaged position and for partially counteracting the spring bias in disengaged position including a control member pivoted on the body and having a lost motion connection with the pedal through a stop portion and a resilient drive portion and a spring having its ends pivoted to the body and control member for overcenter movement, the spring urging the stop portion of the control member against the pedal with the pedal in fully engaged position and urging the drive portion against the pedal with increasing leverage with pedal movement to fully disengaged position.

3. In a motor vehicle of the type having a clutch pedal pivoted on a body pivot post for manual operation between clutch engaged and disengaged positions against clutch spring means that biases the pedal to engaged position with a force that increases with movement of the pedal to disengaged position, the improvement comprising means for augmenting the spring bias on the pedal in engaged position and for partially counteracting the spring bias in disengaged position including a control member pivoted on the body pivot post and having a lost motion connection with the pedal through stop and drive portions and a spring having its ends pivoted to the body and control member for overcenter movement past the body pivot post, the spring urging the stop portion of the control member against the pedal with the pedal in fully engaged position and urging the drive portion against the pedal with increasing leverage with pedal movement to fully disengaged position.

4. In a motor vehicle of the type having a clutch pedal pivoted on a body pivot post for manual operation between clutch engaged and disengaged positions against clutch spring means that biases the pedal to engaged position with a force that increases with movement of the pedal to disengaged position, the improvement comprising means for augmenting the spring bias on the pedal in engaged position and for partially counteracting the spring bias in disengaged position including a control member pivoted on the body pivot post and having a lost motion connection with the pedal through stop and drive portions, a resilient cushion on the drive portion and a spring having its ends pivoted to the body and control member for overcenter movement past the body pivot post, the spring urging the stop portion of the control member against the pedal with the pedal in fully engaged position and urging the resilient cushion of the drive portion against the pedal with increasing leverage with pedal movement to fully disengaged position.

References Cited by the Examiner

UNITED STATES PATENTS

| | | | |
|---|---|---|---|
| 1,393,111 | 10/21 | Getchell | 74—97 X |
| 1,564,261 | 12/25 | Mathieson et al. | 74—560 |
| 1,804,903 | 5/31 | Wemp | 192—995 |
| 1,898,557 | 2/33 | McCune | 74—560 |
| 2,170,172 | 8/39 | Wemp | 192—99 |
| 2,621,538 | 12/52 | Bechman | 74—97 X |
| 2,869,392 | 1/59 | Muller | 74—512 |
| 2,882,744 | 4/59 | Keller | 74—512 |
| 3,009,554 | 11/61 | Frank | 192—99 |
| 3,014,381 | 12/61 | Frank | 74—512 |
| 3,112,820 | 12/63 | Falk | 74—512 X |

BROUGHTON G. DURHAM, *Primary Examiner.*

MILTON KAUFMAN, *Examiner.*